United States Patent [19]

Petruschka

[11] Patent Number: 4,819,253
[45] Date of Patent: Apr. 4, 1989

[54] METHOD FOR DETERMINING PCM CODING LAW

[75] Inventor: Orni Petruschka, Middletown, N.J.

[73] Assignee: Bell Communications Research, Inc., Livingston, N.J.

[21] Appl. No.: 194,343

[22] Filed: May 16, 1988

[51] Int. Cl.$^4$ ............................................. H04B 14/06
[52] U.S. Cl. ......................................... 375/30; 329/1; 329/110; 375/33
[58] Field of Search .................. 375/27, 30, 28, 33; 358/13, 133, 135; 332/1, 9 R, 11 R, 11 D; 329/1, 104; 455/142, 143

[56] References Cited

U.S. PATENT DOCUMENTS 4,491,953  1/1985  Bellisio et al. ..................... 375/27
4,517,596  5/1985  Suzaki .................................. 358/133

Primary Examiner—Benedict V. Safourek
Attorney, Agent, or Firm—James W. Falk; Howard R. Popper

[57] ABSTRACT

Apparatus and method for analyzing a bit stream to determine whether the stream is encoded in A-law PCM or μ-law PCM. Bit positions 2, 3, and 4 are examined to determine which of the 8 possible segment codes are present. Segment codes representing low amplitude speech should predominate statistically over segment codes representing high amplitude speech. If the sample cannot be classified by the appearance of low amplitude segments, the higher amplitude segments are compared and that coding law is detected as being present which accrues the lower count for such high amplitude segments.

5 Claims, 4 Drawing Sheets

STAGE 3

STAGE 4

METHOD FOR DETERMINING PCM CODING LAW

TECHNICAL FIELD OF THE INVENTION

This invention relates to the reception of pulse code modulated signals and more particularly to a system capable of working with signals coded in either μ-law or A-law format.

BACKGROUND OF THE INVENTION

Currently, there are two international standards both specified in CCITT Recommendation G.711 for pulse code modulation. In the United States and Japan μ-law coding is used while in Europe and the rest of the world A-law coding is used. The two standards are highly incompatible, that is, if one standard is used to expand a bit stream that was originally compressed by the other, the result will be unintelligible. Accordingly, when a call is placed between countries using different PCM coding schemes, the network has to provide conversion through the use of a device that converts μ-law to A-law or vice versa. Unfortunately, such conversion may destroy the bit integrity of the signal that is required, for example, in 64 kbit/s ADPCM and in 64 kbit/s data transmission. Calls requiring preservation of bit integrity must therefore be routed via a "bit-transparent" sub-network. Mode switching between data (which requires bit-transparency) and PCM, which must be converted to the appropriate coding law when the call crosses boundaries, cannot be allowed.

Currently, however, network components such as bridges, terminals, switches, etc., cannot detect from an observation of the bit stream which type of coding is being employed. For a circuit to be used alternately for PCM voice and for data during a call would require that signaling be established between the terminals using the circuit so that the code conversion device may selectively be enabled or disabled. It would be a great improvement if a terminal could itself distinguish between the two types of PCM encoding or being used without losing bit integrity and without requiring signaling from the distant terminal.

SUMMARY OF THE INVENTION

It will be recalled that PCM coding makes use of the fact that most of the information content in speech resides in the signals of low amplitude even though speech signals typically involve a wide dynamic amplitude range. Moreover, in PCM coding use is made of the fact that high amplitude signals in speech have a statistically lower rate of occurrence than low amplitude signals. The process of my invention is based on examining the incoming bit stream for the appearance of code patterns in certain bit positions that match the statistical distribution of those patterns as they would be expected to appear in speech that is encoded in μ-law or A-law PCM. If patterns consistent with one of the PCM encoding laws are detected, the appropriate decoding device is enabled. The pattern matching process of my invention may typically be accomplished quickly enough so that no important intelligence carried by the speech will be lost.

GENERAL DESCRIPTION

It will be recalled that both μ-law and A-law encoding schemes adjust the speech amplitude quantization interval so that more levels are employed for small speech amplitudes and fewer at the larger amplitudes. In fact, a histogram plot of speech amplitude versus frequency of occurrences shows that the frequency of occurrence is a monotonically decreasing function of amplitude. Accordingly, the lower amplitude signals are reported with more quantization levels and therefore with greater resolution. In practical embodiments of both the μ-law and A-law encoding schemes, a piecewise linear approximation of speech amplitude is encoded using an 8-bit code. The speech amplitude is encoded in linear "segments" each having 16 "steps". Within each linear segment, the quantizer step size is a constant quantity. The step-sizes in consecutive segments are related by powers of 2. In the 8-bit code word, bit 1 (the most significant bit) represents the sign of the sample, bits 2, 3 and 4 represent one of the eight possible segment numbers and bits 5, 6, 7 and 8 represent one of the sixteen possible step numbers within the segment. To increase the density of ones in the bit stream to be transmitted, the all-zeros code word is not permitted in μ-law PCM (the combination 00000010 being transmitted instead), and the value of every bit, or of every other bit, is normally inverted in the PCM coder before the bit stream is transmitted. This improves the performance of downstream timing and clock recovery circuits.

In accordance with my invention, note is taken of the fact that the code (bits 2, 3, and 4) representing consecutive segments in μ-law PCM, starting with the segment that represents the lowest amplitude, are: 111, 110, 101, 100, 011, 010, 001 and 000. The codes representing consecutive segments in A-law, starting with the segment representing the lowest amplitude, are: 101, 100, 111, 110, 001, 000, 011 and 010. In both cases, each of the foregoing segment patterns is given as it would be sent over the digital facility, i.e., after bit inversion at the transmitter output.

In the illustrative embodiment, the signals in a bit stream are observed for a pre-determined time period. For 8 kHz encoded speech, an illustrative test interval of 100 milliseconds is adequate to provide fine enough distribution (if what is being observed is PCM coded speech) that changes in signal amplitude will be represented by adjacent segment patterns of one of the PCM coding laws. In the test period, bits 2, 3, and 4 of each encoded speech sample are observed and a count is kept of the occurrence of each segment code. If what is present in the bit stream is PCM encoded speech, the segment codes representing the statistically more prevalent low speech amplitudes should not only predominate, but the segment code representing the lowest amplitude, namely 111 in μ-law or 101 in A-law should be present. More specifically, the probability density function of the sample magnitude (which is monotonically decreasing for speech) should be demonstrated by the accrued segment code counts.

Thus, if the sample accrues segment code counts for segment codes 100, 101 and 111 that are some non-zero number, it is highly probable that A-law speech is present since these are three adjacent segment codes representing the lowest amplitude range in A-law. The presence of these segment codes rules out the presence of μ-law encoded speech since, in μ-law, there are segments that have accrued no count (and which have represented lower amplitudes) than some of those for which counts have been accrued in the sample. That is, in μ-law segment code 110 represents a lower amplitude than does 101 or 100 and code 110 should have appeared in the sample if the bit stream represented speech encoded in μ-law.

If counts are accrued for one, two, three, five, six or seven, but not for four or all eight of the eight different segment codes, the segment codes so scored should directly "map" to one or the other of the coding laws. If the distribution of segment counts is "legal" for neither coding law, it is likely that the test period has been too short. On the other hand, if the sample accrues counts for four or for all eight of the segment codes, the additional steps are taken. As an example, let it be assumed that the count for four segments, namely segments 111, 110, 101, and 100, are each non-zero. Referring to the sequences set out above, these four patterns could represent the four lowest amplitude speech signals in either μ-law or A-law. The segment code count accruing for the two segments that represent the highest signal amplitudes for μ-law and A-law coding are compared. In the illustrative example, these segments would be 110 if the sample were encoded in A-law and 110 for μ-law. It will be recalled that high amplitude speech signals have a statistically higher rate of occurrence than low amplitude signals. Accordingly, the segment accruing the lower count is used to determine which coding law is present.

In the event that all eight segment codes accrue a non-zero count, the counts for segments 000 and 010 which represent the highest amplitude signals in μ-law and in A-law, respectively, are compared. Again, the segment accruing the lowest count determines which PCM coding law is to be reported as having been detected in the bit stream. It should be noted that the second highest amplitude segment for each coding law has a statistical behavior similar to that for the highest amplitude segment and it may be appropriate in some cases to test this segment or, alternatively, to base the test on the sum of the count accruing for the two highest amplitude segments, using the lower sum to report the type of PCM coding present.

In a practical signaling system, it will be apparent that the idle channel code will often be transmitted on channels used for speech before speech intelligence is present. These codes, representing low amplitude levels, should accrue counts only for the lowest amplitude segment of one or the other of the PCM coding types. Thus, if μ-law PCM is used, the count should be zero for all segments except the segment for code 111. Code 111 is not the lowest amplitude segment for A-law PCM, thereby determining that μ-law coding is present even before intelligent speech arrives. Alternatively, if A-law coding was used for the idle channel code the non-zero count would accrue for code segment 101. The accrual of a non-zero count for this code rules out the presence of μ-law coding in the bit stream being observed.

In one illustrative embodiment, the above process was tested using a carbon transmitter transmitting speech of both male and female over a 6,000 foot loop. In all cases, 100 millisecond samples were sufficient to make definitive determinations of whether A-law or μ-law coding was present.

In summary, the process of my invention as exemplified in one illustrative embodiment, may be described according to some or all of the following steps:

(a) a count is obtained of the number of times during the interval of observation that a pattern representing one of the eight segment code appears in the bit stream being analyzed:

(b) if the counts accrue for the patterns representing the lowest amplitude consecutive segments for one of the coding laws, that coding law is determined to be present;

(c) if the counts accuring are representative of the lowest adjacent segment codes of both coding laws, the counts accruing for the patterns representing the highest amplitude segments of both coding laws are compared and that coding law is reported whose pattern representing the highest amplitude segment has accrued the lowest count; and (d) finally, if the count distribution is unrepresentative of both of the PCM coding schemes, another interval of observation is undertaken.

DETAILED DESCRIPTION

Figure 1:
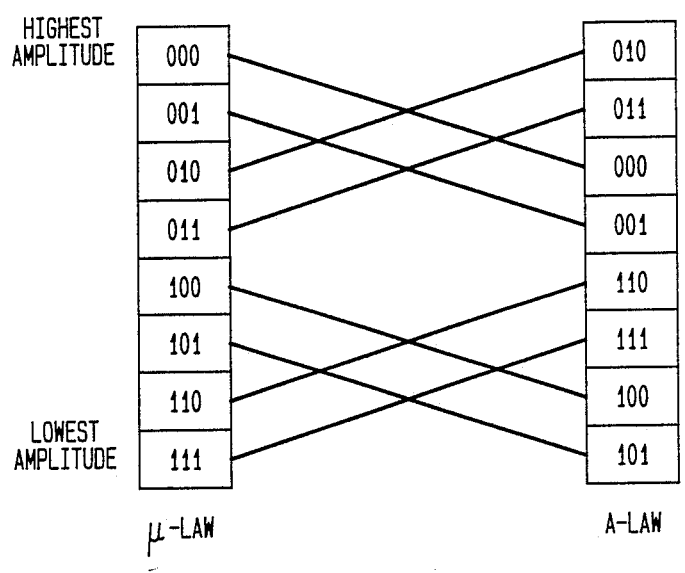
FIG. 1 shows the code patterns for each of the eight segments of u-law and A-law PCM.

In FIG. 1 there are schematically displayed side by side two columns containing the 8 segments and the bit patterns for the lowest through the highest amplitude signals encodable in μ-law and A-law PCM. The diagonal lines running between the two columns are for the convenience of the reader in finding where the same code patterns appear in the μ-law and A-law segments.

Figure 2:
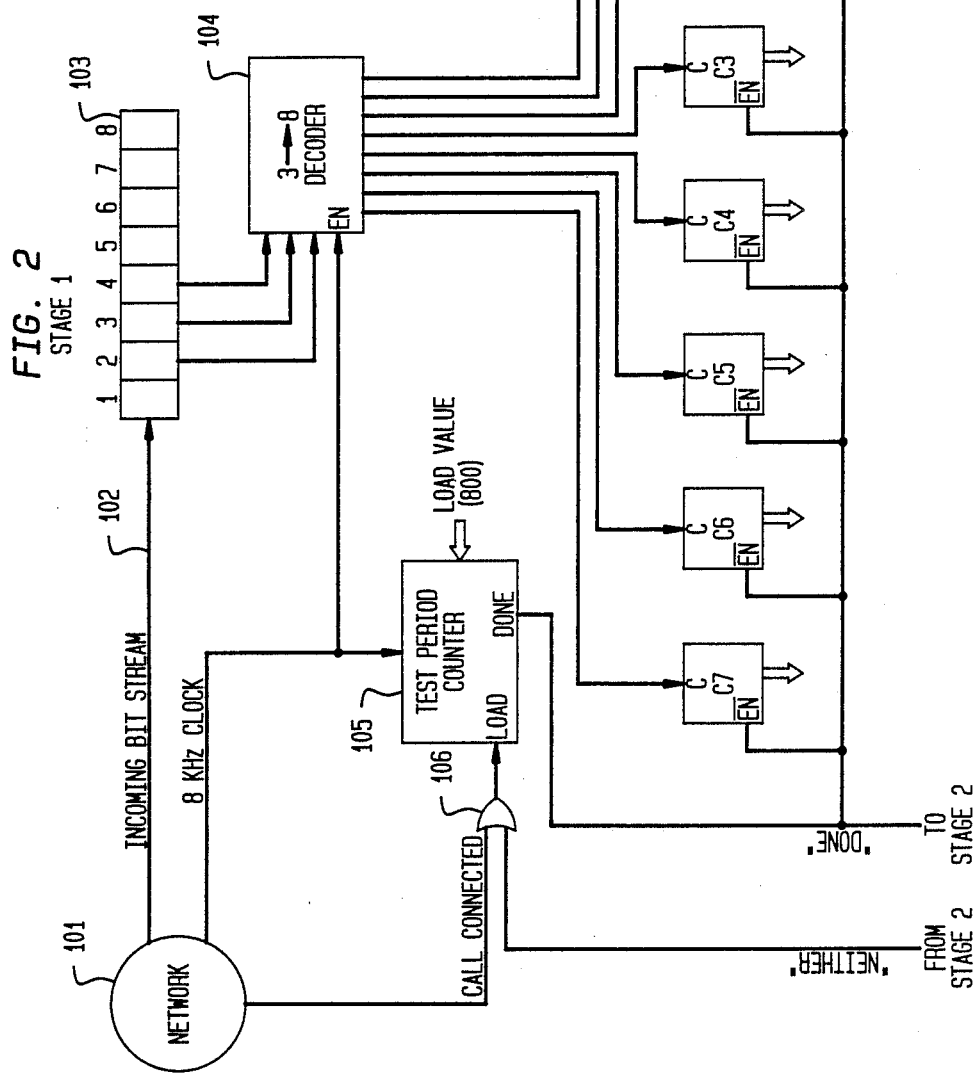
FIG. 2 shows the first stage of an illustrative embodiment of my invention in which predetermined bit positions of the incoming bit stream are examined for the appearance of predetermined code patterns.

FIG. 2 is the first stage of the illustrative circuitry of my invention. A communications network 101 depicted at the upper left hand portion provides a bit stream on lead 102 on which there may appear A-law or μ law encoded PCM signals. The bit stream is entered into an 8-bit shift register 103 and when all 8 bits of an encoded PCM word have been entered (through word-checking circuitry—not shown) the contents of reigster stages 2, 3, and 4 are applied to decoder 104. Decoder 104 senses for the appearance of the 8 segment code patterns shown in FIG. 1 and at its output scores the appropriate one of counters C0–C7 corresponding to the detected pattern. The next 8 bit code word is then entered into shift register 103 and the process is repeated the number of times determined by the load value, illustratively 800, that had been entered into test period counter 105 at the start of the test interval. At the start of the test interval OR-gate 106 will have been enabled by the appearance of a call connected signal from network 101 enabling test period counter 105 to respond to the pre-set load value. When counter 105 has completed its count its output inhibits counters C0–C7 from responding to the inputs from decoder 104 and enables the counters to deliver their accrued counts via OR gates 200–207 (FIG. 3) to the μ-law and A-law legality decision logic circuits 210, 220 of stage 2.

Figure 3:
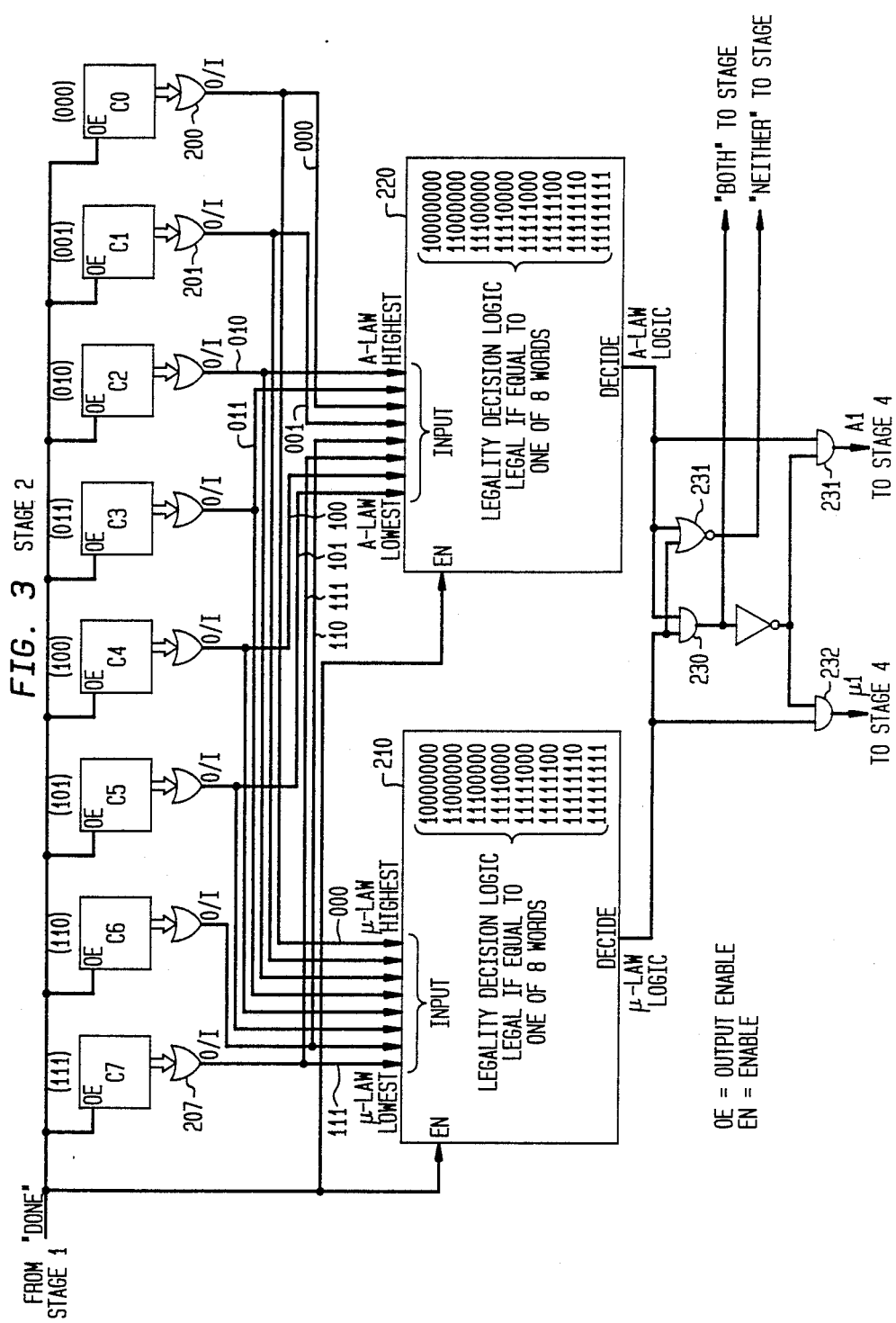
FIG. 3 shows the second stage of the illustrative embodiment in which non-zero counts accruing for detected patterns are checked for validity against patterns valid for both PCM laws.

In FIG. 3, the counters C0 through C7 of FIG. 2 are shown again for the sake of convenience. Each of the counters at its output has a respective OR-gate 200 through 207. The actual count accruing in counters C0–C7 is not needed but only an indication of whether the respective count is non-zero. This is the function provided by OR-gates 200–207. Indeed, to guard against occasional bit errors, the output leads from each counter representing the least, or the least two, significant bits need not be applied to the respective OR-gate so that if the respective count is either 1 or 0 it will be considered as a "0" by the respective OR-gate.

It will be recalled that each of counters C0–C7 accrues a count for a respective one of the 8-bit patterns of FIG. 1. Thus, counter C0 accrues a count for the pattern 000, counter C1 accrues a count for the pattern 001, ... and finally counter C7 accrues a count for the pattern 111. Decision logic units 210 and 220 are identical and test for code count patterns that are "legal" in $\mu$-law and A-law PCM coding, respectively. The difference between the function of circuits 210 and 220 is achieved by the pattern of the input lines connecting them to OR-gates 200–207.

AND-gate 230 is enabled if both logic circuits 210 and 220 detect the appearance of code count patterns that are "legal" $\mu$-law and A-law, respectively. NOR-gate 231 responds if neither circuits 210 or 220 detects a "legal" pattern. AND-gate 232 responds if $\mu$-law logic 210 detects a "legal" pattern that A-law logic 220 does not detect and AND-gate 233 responds when A-law logic 220 detects a legal pattern that circuit 210 does not detect.

Figure 4:
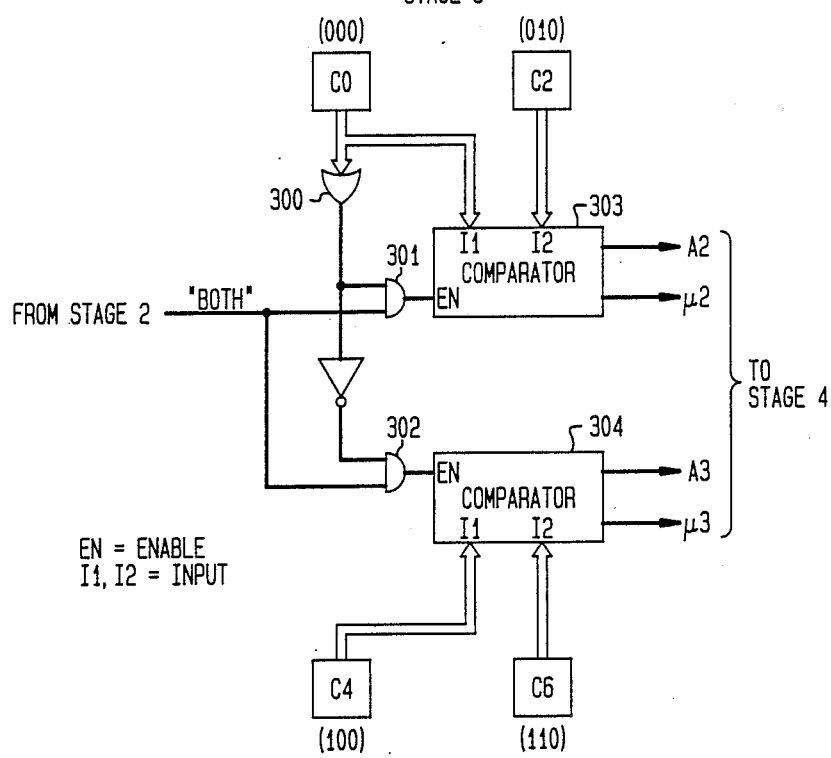
FIG. 4 shows the third stage which compares counts accruing for the patterns representing the highest and lowest amplitude values.

In FIG. 4, the third stage of my invention is depicted. The counters C0–C2 of FIG. 2 are repeated at the top of FIG. 4 and the counters C4 and C6 are repeated at the bottom of the figure for the convenience of the reader. It will be recalled that counter C2 is scored by the appearance of the segment code 010 representing the highest amplitude A-law encoding. Counter C0 is scored by the appearance of pattern 000, the segment representing the highest amplitude signal encodable in $\mu$-law. When AND-gate 230, FIG. 3 is activated it activates AND-gate 301 of FIG. 4 upon the appearance of the signal delivered by OR-gate 300. Comparator 303 compares counts accruing in counters C0 and C2. If counter C2 which is scored upon the appearance of count 010, accrues the higher count, the $\mu$-law output lead $\mu$-2 is energized. If counter C0 accrues the higher count, the A-law lead A-2 is activated.

At the bottom of FIG. 4 counter C4 and C6 of FIG. 2 are repeated for the convenience of the reader. Counter C4 is scored upon the appearance of the pattern 100 and counter C6 is scored upon the appearance of the pattern 110. These two counters will be enabled to have the counts compared by comparator 304 only when counter C0 provides a zero output. Counter C0 will provide a zero output when exactly 4 segments of FIG. 1 accrue a non-zero count. When all 8 segments have a non-zero count comparator 303 is enabled and compares the counts accruing in counter C0 (for pattern 000) and counter C2 (for pattern 010).

Figure 5:
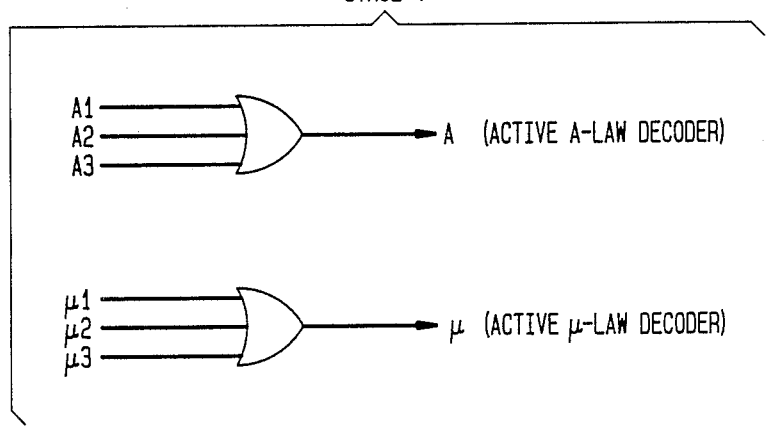
FIG. 5 shows the fourth stage which reports the presence of one or the other of the coding laws.

In stage 4, FIG. 5, the final reporting decision is produced by separately OR-ing all of the A-law output leads and the $\mu$-law output leads of the previous stages.

What has been described is illustrative of one hardware embodiment of my invention. There will now be described a software embodiment.

A software implementation of my process as written in the "C" language, is set forth below:

```
int x, i;
int acount[8]={0,0,0,0,0,0,0,0};
int mcount[8]={0,0,0,0,0,0,0,0};
int total=0;
int mflag=1, aflag=1;
int mpos=1, apos=1;
int middle,edges;
FILE *infile;
infile = fopen("pcmin.ddd", "r");

/* read the input for 100 msec, and accumulate in bins for
   mu-law and for a-law, by the segment number. Bin number
   7 means lowest amplitude. Bin number 0 means
   highest amplitude */ read: for (i=0; i<800; i++)
    {
    fscanf (infile, "%d", &x) ;
    if (x==32767) goto fff;
    total++;
```

```
        x = x & 0x0070;            /* find segment number */ if (x == 0x70) mcount[7]++;
        else if (x == 0x60) mcount[6]++;
        else if (x == 0x50) mcount[5]++;
        else if (x == 0x40) mcount[4]++;
        else if (x == 0x30) mcount[3]++;
        else if (x == 0x20) mcount[2]++;
        else if (x == 0x10) mcount[1]++;
        else mcount[0]++;
      }
assign:
    acount[7]=mcount[5];
    acount[6]=mcount[4];
    acount[5]=mcount[7];
    acount[4]=mcount[6];
    acount[3]=mcount[1];
    acount[2]=mcount[0];
    acount[1]=mcount[3];
    acount[0]=mcount[2];

mflag=aflag=1; mpos=apos=1;

/* Find if the pattern of bin distribution is legal.
     If not, reset proper flag to 0 */
      for (i=7; i>=0; i--)
        { if ((mcount[i]==0) & (mpos==1)) mpos=0;
            else if ((mcount[i]>0) & (mpos==0)) mflag = 0;
          if ((acount[i]==0) & (apos==1)) apos=0;
            else if ((acount[i]>0) & (apos==0)) aflag = 0;}

/* If only one law has legal distribution, select it */
      if ((mflag==0) & (aflag==1)) printf("A LAW 0);
      else if ((mflag==1) & (aflag==0)) printf("MU LAW 0);

/* If both illegal, keep observing the input */
      else if ((mflag==0) & (aflag==0)) printf("NO DECISION0);
```

```
/* If both legal, look at the distribution
   of the lowest non zero bin */
     else {if (mcount[0]==0)
             {if (mcount[4] < acount[4])
                   printf("MU LAW (SUM 4)0);
               else printf ("A LAW (SUM 4)0);}
           else {
               if (mcount[0] < acount[0])
                    printf("MU LAW (SUM 8)0);
               else printf ("A LAW (SUM 8)0);}}
finish:
   total =0;
   for (i=0;i<8;i++)
      acount[i]=mcount[i]=0;
   goto read;
fff:;
}
```

The following is an assembly language implementation for a Texas Instrument 31010 microprocessor of the foregoing C-language.

```
          AORG    0     * BEGIN DATA PAGE DEFINITIONS
  M7      BSS  1  * BIN FOR SEGMENT 111
  M6      BSS  1  * BIN FOR SEGMENT 110
  M5      BSS  1  * BIN FOR SEGMENT 101
  M4      BSS  1  * BIN FOR SEGMENT 100
  M3      BSS  1  * BIN FOR SEGMENT 011
  M2      BSS  1  * BIN FOR SEGMENT 010
  M1      BSS  1  * BIN FOR SEGMENT 001
  M0      BSS  1  * BIN FOR SEGMENT 000
  TOTAL   BSS  1  * COUNTER OF TOTAL NUMBER OF SAMPLES
  ZERO    BSS  1  * =0
  SONE    BSS  1  * =1, SHIFTED 4 BITS TO THE LEFT
  STWO    BSS  1  * =2, SHIFTED 4 BITS TO THE LEFT
  STHREE  BSS  1  * =3, SHIFTED 4 BITS TO THE LEFT
  SFOUR   BSS  1  * =4, SHIFTED 4 BITS TO THE LEFT
  SFIVE   BSS  1  * =5, SHIFTED 4 BITS TO THE LEFT
  SSIX    BSS  1  * =6, SHIFTED 4 BITS TO THE LEFT
  SSEVEN  BSS  1  * =7, SHIFTED 4 BITS TO THE LEFT
```

```
TWO     BSS  1   * =2
ONE     BSS  1   * =1
D800    BSS  1   * =800
WD      BSS  1   * TEMPORARY VARIABLE
MAX     BSS  1   * =32767
MASK    BSS  1   * MASK TO EXTRACT THE SEGMENT BITS (=01110000)
SEG     BSS  1   * SEGMENT NUMBER
MPOS    BSS  1   * MU-LAW INDICATOR OF POSITIVE VALUE IN BINS
APOS    BSS  1   * A-LAW INDICATOR OF POSITIVE VALUE IN BINS
MFLAG   BSS  1   * MU-LAW FLAG
AFLAG   BSS  1   * A-LAW FLAG
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
        BSS  1
```

BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1

BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1
BSS 1

```
BSS   1
BSS   1
BSS   1
BSS   1
BSS   1
BSS   1
BSS   1
AORG  0
B     RESET   *
B     INPUT   *
DATA  0       * BIN FOR SEGMENT 111
DATA  0       * BIN FOR SEGMENT 110
DATA  0       * BIN FOR SEGMENT 101
DATA  0       * BIN FOR SEGMENT 100
DATA  0       * BIN FOR SEGMENT 011
DATA  0       * BIN FOR SEGMENT 010
DATA  0       * BIN FOR SEGMENT 001
DATA  0       * BIN FOR SEGMENT 000
DATA  0       * COUNTER OF TOTAL NUMBER OF SAMPLES
DATA  0       * =0
DATA  >10     * =1, SHIFTED 4 BITS TO THE LEFT
DATA  >20     * =2, SHIFTED 4 BITS TO THE LEFT
DATA  >30     * =3, SHIFTED 4 BITS TO THE LEFT
DATA  >40     * =4, SHIFTED 4 BITS TO THE LEFT
DATA  >50     * =5, SHIFTED 4 BITS TO THE LEFT
DATA  >60     * =6, SHIFTED 4 BITS TO THE LEFT
DATA  >70     * =7, SHIFTED 4 BITS TO THE LEFT
DATA  2       * =2
DATA  1       * =1
DATA  800     * =800
DATA  0       * TEMPORARY VARIABLE
DATA  32767   * =32767
DATA  >70     * MASK TO EXTRACT THE SEGMENT BITS (=01110000)
DATA  0       * SEGMENT NUMBER
DATA  0       * MU-LAW INDICATOR OF POSITIVE VALUE IN BINS
DATA  0       * A-LAW INDICATOR OF POSITIVE VALUE IN BINS
DATA  0       * MU-LAW FLAG
DATA  0       * A-LAW FLAG
DATA  0
DATA  0
```

DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0

DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0
DATA 0

```
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
DATA    0
```
```
************ END OF DATA PAGE IMAGE **************************
* NOTE THAT ALL THE MEMORY IS DEFINED AND IS LOADED IN THE   *
* RESET PROCESS. IT IS NOT REQUIRED FOR THE CORRECT OPERATION *
* OF THE ALGORITHM, BUT IS DONE TO ALLOW EXPANSION BY THE USER*
* (INTEGRATION WITH OTHER PROGRAMS).                          *
**************************************************************
```

```
* RESET: MOVE THE DATA RAM IMAGE FROM ROM TO RAM *
*************************************************
RESET    LDPK    1         * DATA PAGE POINTER TO DATA PAGE
         LACK    1
         SACL    0         * STORE A 1 IN DATA MEMORY LOCATION
         LARK    AR0,15    * MOVE 16 WORDS BEGINNING AT WORD
         LACK    148       * 143 + 1
         LARP    AR0
RESET1   SUB     0         * DECREMENT ACCUMULATOR
         TBLR    *,AR0
         BANZ    RESET1    * REPEAT UNTIL AR0 = 0
*
         LDPK    0         * DATA PAGE POINTER TO DATA PAGE 0
         LACK    1
         SACL    0
         LARK    AR0,127
         LACK    132 * MOVE 128 WORDS BEGINNING AT WORD 127+1
RESET0   SUB     0         * DECREMENT ACC
         TBLR    *,AR0
         BANZ    RESET0    * REPEAT UNTIL AR0 = 0
         SOVM              * SET OVERFLOW ARITHMETIC
*********************************************
* GET SAMPLE AND EXTRACT THE SEGMENT NUMBER *
*********************************************
INPUT  BIOZ   INPUT * WAIT FOR RISING EDGE OF CLOCK (SEE NOTE 1)
STAY   BIOZ   READ       * WAIT FOR FALLING EDGE OF CLOCK
       B      STAY
READ   IN     WD,PA0      * INPUT PCM SAMPLE ON THE FALLING EDGE
       LAC    WD
*                          SEE NOTE 2

AND    MASK       * EXTRACT THREE SEGMENT BITS, STORE IN SEG
       SACL   SEG
```

```
***************************
* CREATE THE "BIN COUNT"   *
***************************
* IN THIS PROCESS, THE SEGMENT THAT WAS EXTRACTED IS          *
* TESTED AGAINST THE EIGHT POSSIBLE COMBINATIONS OF THE       *
* THREE BITS, AND THE APPROPRIATE COUNTER IS INCREMENTED.     *
* ALSO, A COUNT OF THE NUMBER OF SAMPLES THAT WERE CONSIDERED *
* IS HELD.  WHEN THIS COUNT REACHES THE VALUE IN D800         *
* (CURRENTLY SET TO 800, FOR 100 MSEC WORTH OF DATA),         *
* THE PROCESS IS COMPLETED.                                   *
***************************************************************
        XOR    SSEVEN    * CHECK IF SEGMENT IS 111
        BNZ    TSIX      * NO
            LAC   M7     * YES, INCREMENT THE M7 COUNTER
            ADD   ONE
            SACL  M7
    B   ENDS   * BRANCH TO TEST IF "BIN COUNT" IS COMPLETED
TSIX    LAC SEG           * CHECK IF SEGMENT IS 110
        XOR    SSIX
        BNZ    TFIVE     * NO
            LAC   M6     * YES, INCREMENT THE M6 COUNTER
            ADD   ONE
            SACL  M6
    B   ENDS   * BRANCH TO TEST IF "BIN COUNT" IS COMPLETED
TFIVE   LAC SEG           * CHECK IF SEGMENT IS 101
        XOR    SFIVE
        BNZ    TFOUR     * NO
            LAC   M5     * YES, INCREMENT THE M5 COUNTER
            ADD   ONE
            SACL  M5
    B   ENDS   * BRANCH TO TEST IF "BIN COUNT" IS COMPLETED
TFOUR   LAC SEG           * CHECK IF SEGMENT IS 100
        XOR    SFOUR
        BNZ    TTHREE    * NO
            LAC   M4     * YES, INCREMENT THE M4 COUNTER
            ADD   ONE
            SACL  M4
```

```
        B       ENDS    * BRANCH TO TEST IF "BIN COUNT" IS COMPLETED
TTHREE  LAC SEG         * CHECK IF SEGMENT IS 011
        XOR     STHREE
        BNZ     TTWO    * NO
        LAC     M3      * YES, INCREMENT THE M3 COUNTER
        ADD     ONE
        SACL    M3
        B       ENDS    * BRANCH TO TEST IF "BIN COUNT" IS COMPLETED
TTWO    LAC SEG         * CHECK IF SEGMENT IS 010
        XOR     STWO
        BNZ     TONE    * NO
        LAC     M2      * YES, INCREMENT THE M2 COUNTER
        ADD     ONE
        SACL    M2
        B       ENDS    * BRANCH TO TEST IF "BIN COUNT" IS COMPLETED
TONE    LAC SEG         * CHECK IF SEGMENT IS 001
        XOR     SONE
        BNZ     TZERO   * NO
        LAC     M1      * YES, INCREMENT THE M1 COUNTER
        ADD     ONE
        SACL    M1
        B       ENDS    * BRANCH TO TEST IF "BIN COUNT" IS COMPLETED
TZERO   LAC     M0      * SEGMENT MUST BE 000, INCREMENT M0
        ADD     ONE
        SACL    M0
ENDS    LAC TOTAL       * INCREMENT COUNTER OF TESTED SAMPLES
        ADD     ONE
        SACL    TOTAL
        XOR     D800    * CHECK IF COUNTER REACHED THE LIMIT
        BNZ     INPUT   * NO, RETURN TO PROCESS NEXT SAMPLE
*                         YES, CONTINUE TO THE PATTERN VALIDITY CHECKS
*************************
* PATTERN VALIDITY CHECKS *
*************************
PATTER  LAC     ONE     * SET THE FLAGS FOR MU-LAW AND A-LAW
        SACL    MPOS
        SACL    APOS
        SACL    MFLAG
        SACL    AFLAG
```

```
*****************************************
* PATTERN VALIDITY CHECK FOR MU-LAW *
******************************************************
* THE PROCESS TESTS IF THE PATTERN IN THE BINS IS LEGAL   *
* FOR MU-LAW INPUT. THIS IS DONE BY SCANNING THE BINS     *
* FROM M7 TO M0, AND LOOKING FOR A "TRANSITION" FROM A    *
* ZERO-COUNT BIN TO A NON-ZERO COUNT BIN. IF SUCH A       *
* TRANSITION IS DETECTED (FOR EXAMPLE, M2=0 AND M1>0) THAN *
* THE PATTERN IS NOT VALID.  THE PATTERN IS ALSO DECLARED *
* NON-VALID AS A MU-LAW PATTERN IF M7=0, REGARDLESS OF    *
* COUNT IN OTHER SAMPLES (THERE IS NO NEED TO FIND THE    *
* ACTUAL TRANSITION, IT IS SUFFICIENT JUST TO KNOW THAT   *
* IT EXISTS, AND THIS IS TRUE IF M7=0)                    *
******************************************************
L       LAC     M7      * IF M7 IS 0, MU-LAW IS IMPOSSIBLE
        BNZ     LM6     * M7 NOT 0, CONTINUE CHECKING
        SACL    MFLAG   * M7 IS 0, RESET THE MU-LAW FLAG
        B       LA7     * BRANCH TO A-LAW PATTERN VALIDITY CHECK
LM6     LAC     M6      * IF M6 IS 0, RESET THE "MU-LAW POSITIVE" FLAG
        BNZ     LM5     * M6 NOT 0, CONTINUE CHECKING
        SACL    MPOS    * RESET "MU-LAW POSITIVE" FLAG
LM5     LAC M5          * IF M5 IS 0, RESET THE "MU-LAW POSITIVE" FLAG
        BNZ     MZPC5   * M5 NOT 0, TEST FOR POSSIBLE PATTERN
                          VIOLATION
        SACL    MPOS
        B       LM4     * CONTINUE CHECKING
MZPC5 LAC MPOS          * IF "MU-LAW POSITIVE FLAG"=0, MU-LAW VIOLATION
        BNZ     LM4     * NO VIOLATION (BINS M7-M5 POSITIVE), CONTINUE
        SACL    MFLAG   * VIOLATION, RESET MU-LAW FLAG
        B       LA7     * BRANCH TO A-LAW PATTERN VALIDITY CHECK
LM4     LAC     M4      * IF M4 IS 0, RESET THE "MU-LAW POSITIVE"
                          FLAG
        BNZ     MZPC4   * M4 NOT 0, TEST FOR POSSIBLE PATTERN
                          VIOLATION
        SACL    MPOS
        B       LM3     * CONTINUE CHECKING
MZPC4 LAC     MPOS      * IF "MU-LAW POSITIVE FLAG"=0, MU-LAW
                          VIOLATION
        BNZ     LM3     * NO VIOLATION (BINS M7-M4 POSITIVE),
                          CONTINUE
```

```
        SACL    MFLAG    * VIOLATION, RESET MU-LAW FLAG
        B       LA7      * BRANCH TO A-LAW PATTERN VALIDITY CHECK
LM3     LAC     M3       * IF M3 IS 0, RESET THE "MU-LAW POSITIVE"
        BNZ     MZPC3    * M3 NOT 0, TEST FOR POSSIBLE PATTERN
                           VIOLATION
        SACL    MPOS
        B       LM2      * CONTINUE CHECKING
MZPC3   LAC     MPOS     * IF "MU-LAW POSITIVE FLAG"=0, MU-LAW
                           VIOLATION
        BNZ     LM2      * NO VIOLATION (BINS M7-M3 POSITIVE),
                           CONTINUE
        SACL    MFLAG    * VIOLATION, RESET MU-LAW FLAG
        B       LA7      * BRANCH TO A-LAW PATTERN VALIDITY CHECK
LM2     LAC     M2       * IF M2 IS 0, RESET THE "MU-LAW POSITIVE"
        BNZ     MZPC2    * M2 NOT 0, TEST FOR POSSIBLE PATTERN
                           VIOLATION
        SACL    MPOS
        B       LM1      * CONTINUE CHECKING
MZPC2   LAC     MPOS     * IF "MU-LAW POSITIVE FLAG"=0, MU-LAW
                           VIOLATION
        BNZ     LM1      * NO VIOLATION (BINS M7-M2 POSITIVE),
                           CONTINUE
        SACL    MFLAG    * VIOLATION, RESET MU-LAW FLAG
        B       LA7      * BRANCH TO A-LAW PATTERN VALIDITY CHECK
LM1     LAC     M1       * IF M1 IS 0, RESET THE "MU-LAW POSITIVE"
                           FLAG
        BNZ     MZPC1    * M1 NOT 0, TEST FOR POSSIBLE PATTERN
                           VIOLATION
        SACL    MPOS
        B       LM0      * CONTINUE CHECKING
MZPC1   LAC     MPOS     * IF "MU-LAW POSITIVE FLAG"=0, MU-LAW
                           VIOLATION
        BNZ     LA7      * NO VIOLATION, M7-M1 POSITIVE, PATTERN
                           VALID
        SACL    MFLAG    * VIOLATION, RESET MU-LAW FLAG
        B       LA7      * BRANCH TO A-LAW PATTERN VALIDITY CHECK
LM0     LAC     M0       * IF M0 IS 0, PATTERN IS VALID
        BNZ     MZPC0
        B       LA7      * PATTERN VALID, BRANCH TO TEST A-LAW
                           PATTERN
```

```
MZPC0    LAC      MPOS    * IF "MU-LAW POSITIVE FLAG"=0, MU-LAW
                            VIOLATION
         BNZ      LA7     * PATTERN VALID, BRANCH TO TEST A-LAW
                            PATTERN
         SACL     MFLAG   * VIOLATION, RESET MU-LAW FLAG
**********************************
* PATTERN VALIDITY CHECK FOR A-LAW *
***********************************************************
* THE PROCESS HERE IS IDENTICAL TO THE ONE USED FOR MU-LAW, *
* EXCEPT THAT THE FOLLOWING MAPPING IS USED FOR REARRANGING *
* THE BINS ACCORDING TO THE AMPLITUDES THEY REPRESENT IN A-LAW
*         A7 = M5                                           *
*         A6 = M4                                           *
*         A5 = M7                                           *
*         A4 = M6                                           *
*         A3 = M1                                           *
*         A2 = M0                                           *
*         A1 = M3                                           *
*         A0 = M2                                           *
***********************************************************
LA7      LAC  M5    * IF M5(=A7) IS 0, A-LAW IS IMPOSSIBLE
         BNZ LA6    * A7 NOT 0, CONTINUE CHECKING
     SACL    AFLAG  * A7 IS 0, RESET THE A-LAW FLAG
     B       SELECT * BRANCH TO SELECTION PROCESS
LA6  LAC     M4     * IF M4(=A6) IS 0, RESET THE "A-LAW
                      POSITIVE" FLAG
     BNZ     LA5    * A6 NOT 0, CONTINUE CHECKING
     SACL    APOS   * RESET "A-LAW POSITIVE" FLAG
LA5  LAC     M7     * IF M7(=A5) IS 0, RESET THE "A-LAW
                      POSITIVE" FLAG
     BNZ     AZPC5  * A5 NOT 0, TEST FOR POSSIBLE PATTERN
                      VIOLATION
     SACL    APOS
     B       LA4    * CONTINUE CHECKING
AZPC5 LAC    APOS   * IF "A-LAW POSITIVE FLAG"=0, A-LAW
                      VIOLATION
     BNZ     LA4    * NO VIOLATION (BINS A7-A5 POSITIVE),
                      CONTINUE
     SACL    AFLAG  * VIOLATION, RESET A-LAW FLAG
     B       SELECT * BRANCH TO SELECTION PROCESS
```

```
LA4     LAC     M6      * IF M6(=A4) IS 0, RESET THE "A-LAW
                          POSITIVE" FLAG
        BNZ     AZPC4   * A4 NOT 0, TEST FOR POSSIBLE PATTERN
                          VIOLATION
        SACL    APOS
        B       LA3     * CONTINUE CHECKING
AZPC4   LAC     APOS    * IF "A-LAW POSITIVE FLAG"=0,
                          A-LAW VIOLATION
        BNZ     LA3     * NO VIOLATION (BINS A7-A4 POSITIVE),
                          CONTINUE
        SACL    AFLAG   * VIOLATION, RESET A-LAW FLAG
        B       SELECT  * BRANCH TO SELECTION PROCESS
LA3     LAC     M1      * IF M1(=A3) IS 0, RESET THE "A-LAW
                          POSITIVE" FLAG
        BNZ     AZPC3   * A3 NOT 0, TEST FOR POSSIBLE PATTERN
                          VIOLATION
        SACL    APOS
        B       LA2     * CONTINUE CHECKING
AZPC3   LAC     APOS    * IF "A-LAW POSITIVE FLAG"=0, A-LAW
                          VIOLATION
        BNZ     LA2     * NO VIOLATION (BINS A7-A3 POSITIVE),
                          CONTINUE
        SACL    AFLAG   * VIOLATION, RESET A-LAW FLAG
        B       SELECT  * BRANCH TO SELECTION PROCESS
LA2     LAC     M0      * IF M0(=A2) IS 0, RESET THE "A-LAW
                          POSITIVE" FLAG
        BNZ     AZPC2   * A2 NOT 0, TEST FOR POSSIBLE PATTERN
                          VIOLATION
        SACL    APOS
        B       LA1     * CONTINUE CHECKING
AZPC2   LAC     APOS    * IF "A-LAW POSITIVE FLAG"=0,
                          A-LAW VIOLATION
        BNZ     LA1     * NO VIOLATION (BINS A7-A2 POSITIVE),
                          CONTINUE
        SACL    AFLAG   * VIOLATION, RESET A-LAW FLAG
        B       SELECT  * BRANCH TO SELECTION PROCESS
LA1     LAC     M3      * IF M3(=A1) IS 0, RESET THE "A-LAW
                          POSITIVE" FLAG
        BNZ     AZPC1   * A1 NOT 0, TEST FOR POSSIBLE PATTERN
                          VIOLATION
```

```
        SACL    APOS
        B       LA0     * CONTINUE CHECKING
AZPC1   LAC     APOS    * IF "A-LAW POSITIVE FLAG"=0, A-LAW
                          VIOLATION
        BNZ     SELECT  * NO VIOLATION, A7-A1 POSITIVE,
                          PATTERN VALID
        SACL    AFLAG   * VIOLATION, RESET A-LAW FLAG
        B       SELECT  * BRANCH TO SELECTION PROCESS
LA0     LAC     M2      * IF M2(=A0) IS 0, PATTERN IS VALID
        BNZ     AZPC0
        B       SELECT  * PATTERN VALID, BRANCH TO SELECTION
                          PROCESS
AZPC0   LAC     APOS    * IF "A-LAW POSITIVE FLAG"=0, A-LAW
                          VIOLATION
        BNZ     SELECT  * PATTERN VALID, BRANCH TO SELECTION
                          PROCESS
        SACL    AFLAG   * VIOLATION, RESET A-LAW FLAG
********************
* SELECTION PROCESS *
*************************************************************
* IN THE SELECTION PROCESS THE OUTPUT OF THE PATTERN TEST    *
* IS EXAMINED.  IF ONE OF THE FLAGS IS SET THEN THE          *
* CORRESPONDING CODING LAW IS DECIDED UPON. IF BOTH ARE SET, *
* THEN THE PROGRAM JUMPS TO THE PROCESS OF SELECTION BY      *
* NUMBERS IN SPECIFIC BINS. IF NEITHER IS SET, THE PROGRAM   *
* CANNOT DECIDE AND RETURNS TO OBTAIN ANOTHER COUNT.         *
*************************************************************
SELECT  LAC     MFLAG      * TEST IF FLAGS ARE IDENTICAL
        XOR     AFLAG
        BZ      NODEC      * YES, CANNOT DECIDE ONLY BY PATTERN
        LAC     MFLAG      * NO, CHECK WHICH ONE IS SET
        BZ      DECA1
        OUT     ZERO,PA0   * OUTPUT ZERO TO INDICATE MU-LAW
        B       NEXT       * BRANCH TO NEXT DECISION (NOTE 3)
DECA1   OUT     ONE,PA0    * OUTPUT ONE TO INDICATE A-LAW
        B       NEXT       * BRANCH TO NEXT DECISION (NOTE 3)
NODEC   LAC     MFLAG      * IDENTICAL FLAGS
        BNZ     BOTH       * TEST IF FLAGS ARE SET
        OUT     TWO,PA0    * NO, OUTPUT TWO TO INDICATE
                             NO DECISION
        B       NEXT       * BRANCH TO NEXT DECISION (NOTE 3)
```

```
*************************
* TEST BY COMPARING BINS *
***********************************************************
* THIS PROCESS WILL BE REACHED IF EITHER EXACTLY FOUR BINS *
* HAVE A NON ZERO COUNT, NAMELY BINS M7, M6, M5, AND M4, OR*
* ALL EIGHT BINS HAVE A NON-ZERO COUNT.  IN THE FIRST CASE,*
* M4 IS COMPARED WITH M6. IN THE SECOND CASE, M0 IS        *
* COMPARED WITH M2.                                        *
***********************************************************
BOTH      LAC     M0        * CHECK IF M0=0
    BNZ       EIGHT   * YES, ALL EIGHT BINS HAVE NON-ZERO COUNT
        LAC     M4    * NO, FOUR BINS (M7-M4) HAVE NON-ZERO COUNT
        SUB     M6    * COMPARE M4 WITH M6
           BGZ     DA2 * M4 > M6, DECIDE A-LAW
    OUT   ZERO,PA0    * M6 <= M4, DECIDE MU-LAW,
                        OUTPUT THE DECISION
         B    NEXT    * BRANCH TO NEXT DECISION (NOTE 3)
DA2 OUT ONE,PA0       * OUTPUT A-LAW DECISION
   B    NEXT          * BRANCH TO NEXT DECISION (NOTE 3)
EIGHT  SUB M2         * ALL EIGHT BINS ARE NON-ZERO.
                        COMPARE M0 WITH M2
    BGZ  DA3          * M0 > M2, DECIDE A-LAW
OUT     ZERO,PA0      * M2 <= M0, DECIDE MU-LAW,  OUTPUT THE
                        DECISION
   B    NEXT          * BRANCH TO NEXT DECISION (NOTE 3)
DA3 OUT ONE,PA0       * OUTPUT A-LAW DECISION
**********************************************
* DECISION IS COMPLETED. PREPARE FOR NEXT ONE *
**********************************************
NEXT      LAC     ZERO    * RESET BINS AND COUNTER OF SAMPLES.
          SACL    TOTAL
          SACL    M7
          SACL    M6
          SACL    M5
          SACL    M4
          SACL    M3
          SACL    M2
          SACL    M1
          SACL    M0
```

```
B          INPUT         * BRANCH TO START NEXT DECISION PROCESS
**********************************************************
*NOTE 1:                                                  *
*THE PROGRAM IS WRITTEN TO READ A SAMPLE ON THE FALLING   *
*EDGE OF AN EIGHT KHZ CLOCK INPUT AT THE BIO LINE OF THE  *
*TMS32010. IN SIMULATION ENVIRONMENT, WHERE THERE IS NO   *
*ACTUAL CLOCK, THE INSTRUCTION CAN BE REPLACED WITH A     *
*NO OPERATION (NOP). THE SAME HOLDS FOR THE TWO           *
*FOLLOWING INSTRUCTIONS                                   *
*                                                         *
*NOTE 2:                                                  *
*IN SIMULATION ENVIRONMENT, WHERE THE INPUT IS CONTAINED  *
*IN A FILE, THE FOLLOWING COMMANDS CAN BE INSERTED TO     *
*ASSURE THAT THE PROGRAM DOES NOT TRY TO READ AFTER       *
*IT READ THE LAST SAMPLE:                                 *
```

While this invention has been described and shown with reference to an illustrative embodiment thereof, it will be understood by those skilled in the art that changes in form and detail may be made therein without departing from the spirit and scope of the invention.

What is claimed is:

1. A process for classifying a bit stream as being encoded in A-law, or $\mu$-law PCM, comprising the steps of:
   (a) examining predetermined bit-positions of the bit stream for the appearance of predetermined code patterns during a monitoring interval,
   (b) accruing a count during said interval respective to the appearance of each of said patterns; and
   (c) determinating the presence of A-law PCM coding when the count accrues only for that pattern representing the lowest amplitude signal capable of being encoded in A-law PCM and reporting the presence of $\mu$-law PCM when the count accrues only for that pattern representing the lowest amplitude signal capable of being encoded in $\mu$-law PCM.

2. The process in accordance with claim 1 further comprising the steps of:
   (a) comparing the counts accruing for the patterns representing the higher amplitude signals according to both said PCM encoding laws, and
   (b) determining the presence of that PCM law encoding for that one of the compared patterns that has accrued the lowest count.

3. The method of claim 2 wherein said step of comparing includes the comparing of the non-zero counts accruing for the patterns representing the highest amplitudes signals of both said encoding laws.

4. Apparatus for classifying a bit stream as being encoded in A-law PCM, or $\mu$-law PCM, comprising:
   (a) means for defining a monitoring interval,
   (b) means for examining predetermined bit-positions of the bit stream for the appearance of predetermined code patterns during said monitoring interval,
   (c) means for accruing a count during said interval respective to the appearance of each of said patterns, and
   (d) means for signaling the presence A-law PCM coding when said count accrues only for that pattern representing the lowest amplitude signal capable of being encoded in A-law PCM and for signaling the presence of $\mu$-law PCM when said count accrues only for that pattern representing the lowest amplitude signal capable of being encoded in $\mu$-law PCM.

5. Apparatus according to claim 4 wherein said means for signaling further comprises means for comparing the counts accruing for the patterns representing the higher amplitude signals according to both said PCM encoding laws, and means for determining the presence of that PCM law encoding for that one of the compared patterns that has accrued the lowest count.

* * * * *

UNITED STATES PATENT AND TRADEMARK OFFICE
CERTIFICATE OF CORRECTION

PATENT NO. : 4,819,253

DATED : 4/4/89

INVENTOR(S) : Orni Petruschka

It is certified that error appears in the above-identified patent and that said Letters Patent is hereby corrected as shown below:

Column 3, line 21; text should read – be 110 if the sample were encoded in A-law and 100 for

End of program, before column 43, line 30; should read as follows:

```
*                      XOR  MAX                  *      *
*                           BZ   FIN                    *
*                           LAC  WD                     *
*WHERE "MAX" IS THE PATTERN THAT SIGNALS THE END-OF-FILE, *
*CURRENTLY SET TO 32767, AND THE SELF LOOP COMMAND      *
*                      FIN B     FIN                    *
*JUST BEFORE THE ASSEMBLY DIRECTIVE "END".              *
*                                                       *
*NOTE 3:                                                *
*DEPENDING ON THE IMPLEMENTATION, USERS MAY WISH THAT THE *
*ALGORITHM CONTINUES TO CHECK THE INPUT AND PRODUCE A/MU *
*DECISIONS.  IF THIS IS NOT REQUIRED, THAN THERE IS NO  *
*NEED TO BRANCH TO THE NEXT DECISION PROCESS            *
*********************************************************
     END
```

Signed and Sealed this

Thirteenth Day of February, 1990

Attest:

JEFFREY M. SAMUELS

*Attesting Officer*     Acting Commissioner of Patents and Trademarks